Feb. 17, 1942.  L. F. BANNON  2,273,554
MANUFACTURE OF LAMINATED MATERIAL
Filed Feb. 14, 1940  3 Sheets-Sheet 1
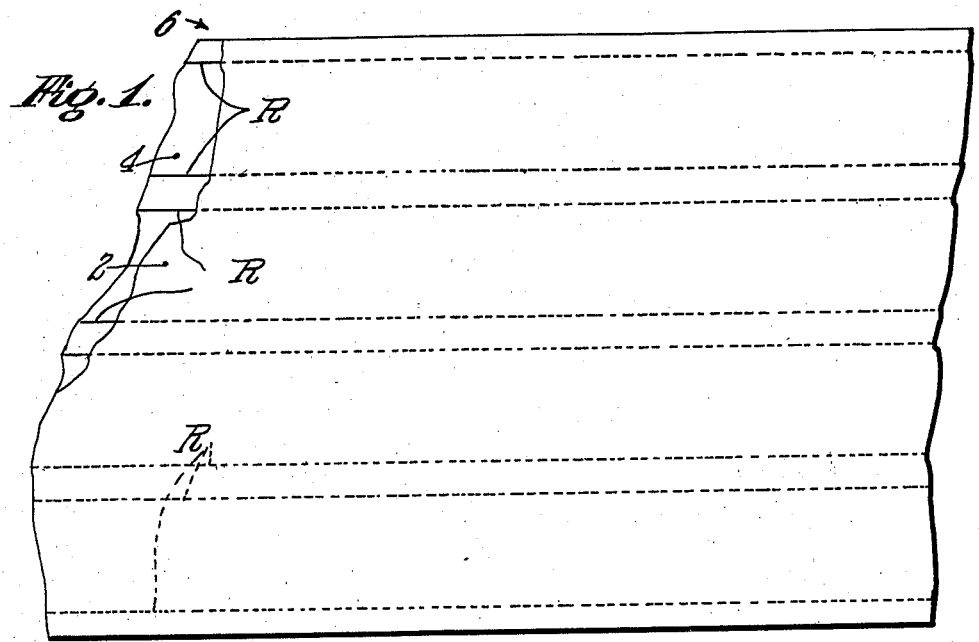
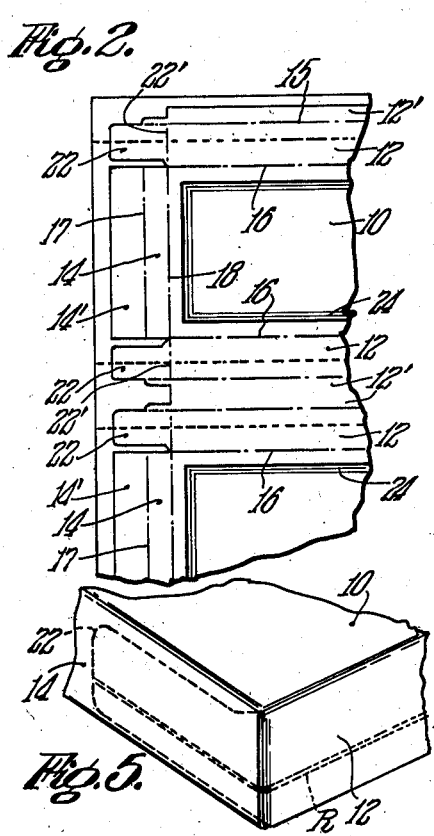
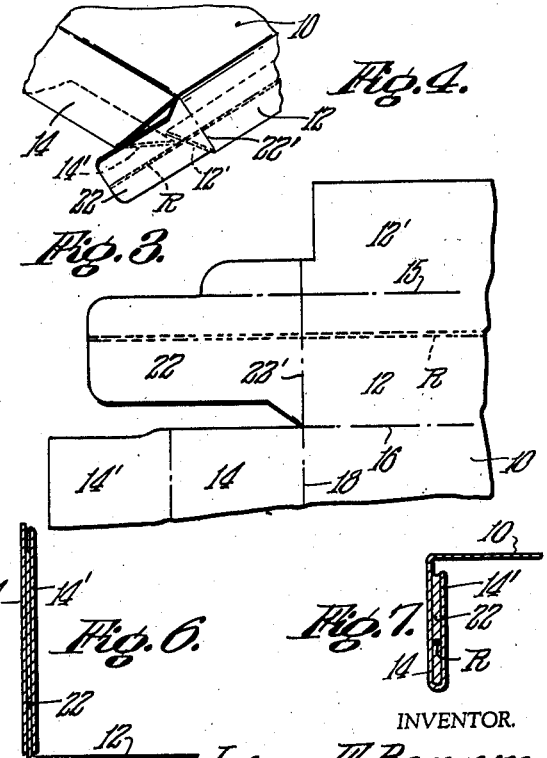
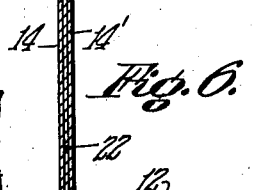
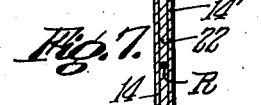
INVENTOR.
Leroy F. Bannon.
BY
ATTORNEY.

Feb. 17, 1942.  L. F. BANNON  2,273,554
MANUFACTURE OF LAMINATED MATERIAL
Filed Feb. 14, 1940  3 Sheets-Sheet 2

INVENTOR.
Leroy F. Bannon.
BY Walter C. Ross.
ATTORNEY.

Feb. 17, 1942.  L. F. BANNON  2,273,554
MANUFACTURE OF LAMINATED MATERIAL
Filed Feb. 14, 1940  3 Sheets-Sheet 3
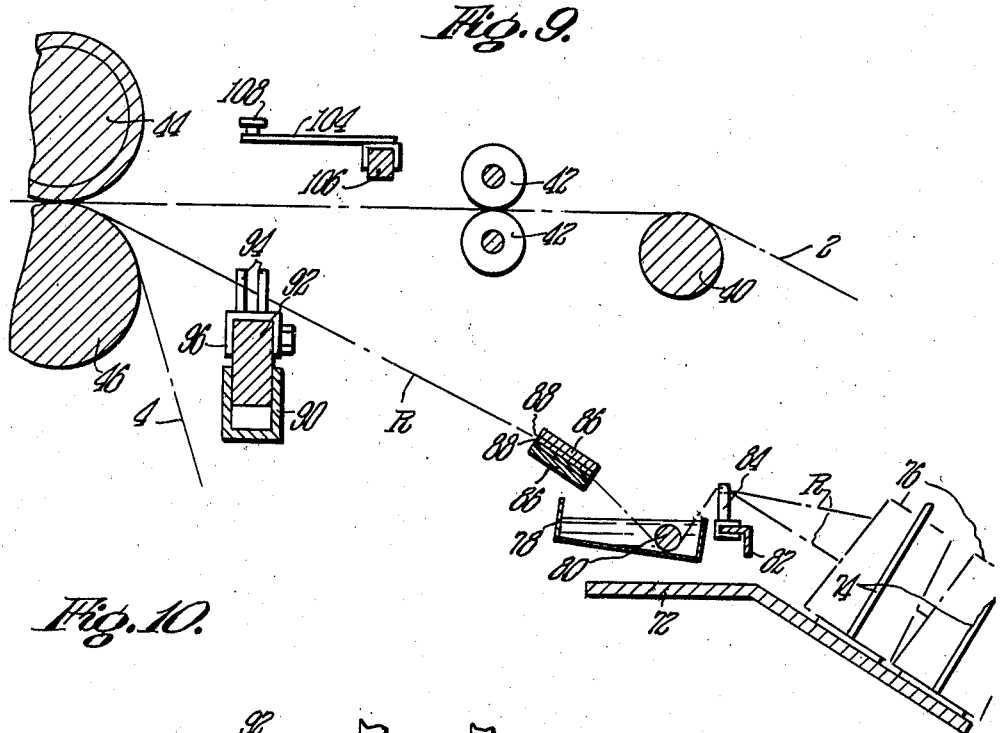
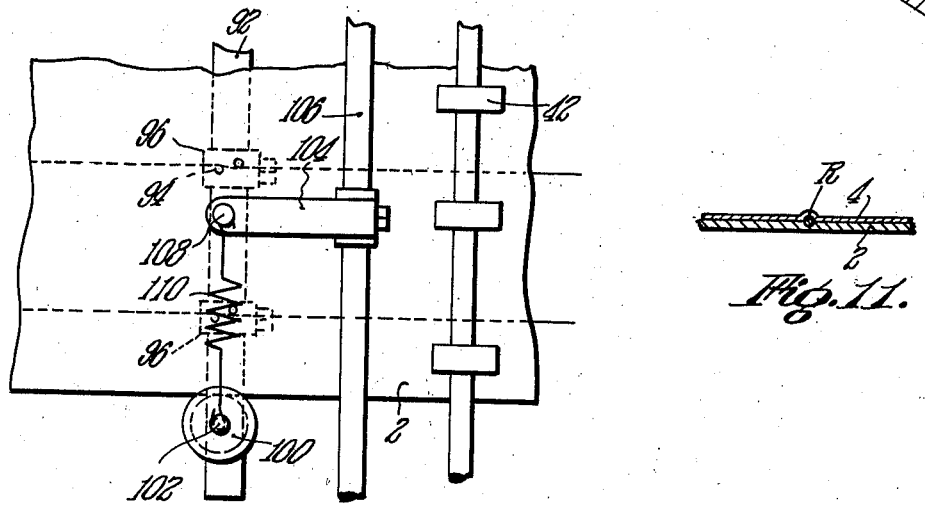
INVENTOR
Leroy F. Bannon.
BY
ATTORNEY Patented Feb. 17, 1942

2,273,554

UNITED STATES PATENT OFFICE 2,273,554

MANUFACTURE OF LAMINATED MATERIAL

Leroy F. Bannon, Norwich, Conn., assignor to Atlantic Carton Corporation, Norwich, Conn., a corporation of Connecticut Application February 14, 1940, Serial No. 318,871

3 Claims. (Cl. 154—1)

This invention relates to improvements in the manufacture of reinforced laminated material.

The principal objects of the invention are directed to the provision of a method of and apparatus for the manufacture of reinforced laminated sheet material and the product thereof. According to the novel features of the invention plural plies of material are secured together with a reinforcing member or members therebetween whereby to form a composite reinforced structure.

The novel features of the invention are adapted for broad application but will be described in connection with the box-making art for purposes of disclosure.

For use in connection with the box-making art, at least two plies of material, such as cardboard and a paper liner, are secured together by an adhesive with reinforcing members therebetween. The reinforcing members are disposed relative to one another in such a way that when the laminated material is cut into sheets, which usually are then cut into blanks and may also be ornamented or printed. the blanks may be set up to form a box, or closure therefor, or both with the reinforcing element or elements disposed in a predetermined relation in said box or closure.

Various other novel features and advantages of the invention will be hereinafter more fully referred to in connection with the accompanying description of the preferred form of the invention.

In the drawings:

Fig. 1 is a plan view of a section of composite material embodying the novel features of the invention;

Fig. 2 is a plan view of a portion of a finished sheet of material to explain certain features of the invention;

Fig. 3 is a plan view of a corner portion of a box-blank;

Fig. 4 is a perspective view of a corner portion of a box-blank;

Fig. 5 is a perspective view showing what is shown in Fig. 4 in set-up relation;

Fig. 6 is a sectional plan view through a corner of the set-up box in Fig. 5;

Fig. 7 is a partial elevational view through the end portion of the box shown in Fig. 5;

Fig. 9 is a partial longitudinal sectional elevational view through the apparatus shown in Figs. 8a and 8b;

Fig. 10 is a plan view of a portion of the apparatus shown in Fig. 9; and

Fig. 11 is a sectional view through a section of the laminated sheet of the invention.

Figure 8A:
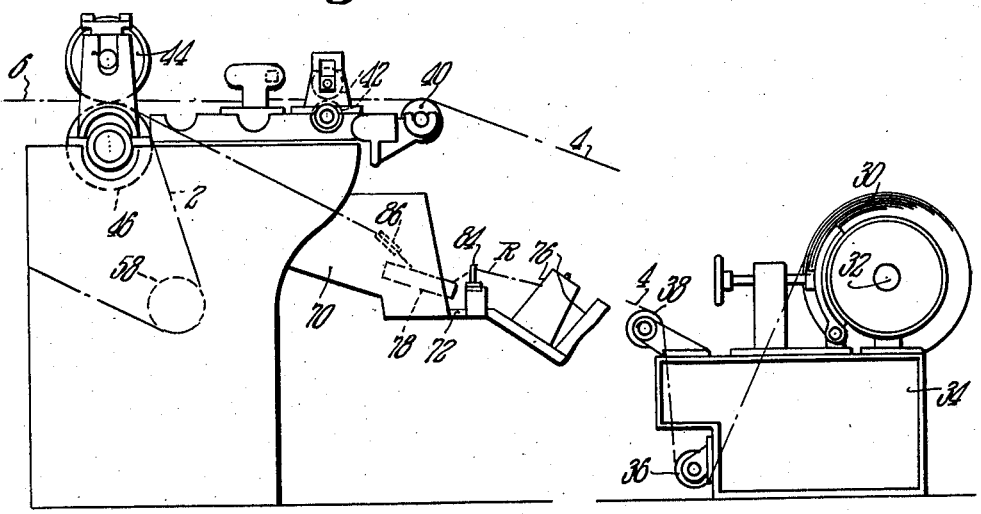
Figs. 8a and 8b are side elevational diagrammatic views showing one form of apparatus for carrying out the invention.
Figure 8B:
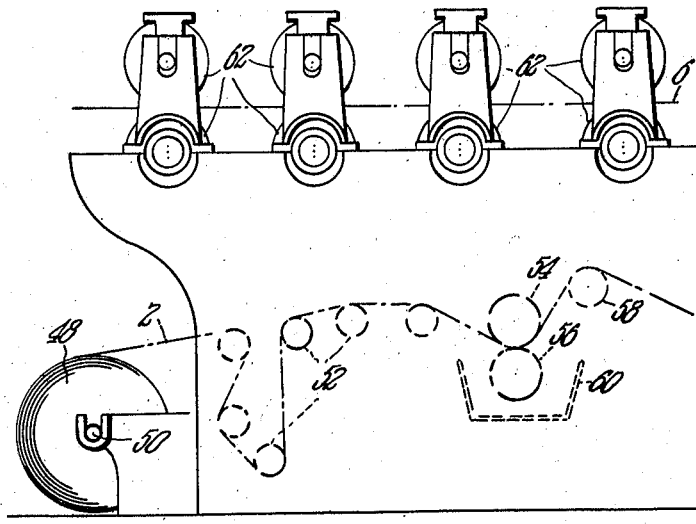

Referring to the drawings more in detail, the novel features of the invention will now be described.

It will be understood that the features of the invention are adapted for broad application and for use with various materials. For purposes of disclosure the invention will be described in connection with material for boxes and closures and a box or closure made therefrom.

According to the invention, there is provided a composite structure formed by at least a pair of elements in web form which are secured together by an adhesive and between which there is a reinforcing member or members. The material of the webs may be anything desired.

In the making of material for boxes and the like, a web of chip-board or card-board 2 has secured thereto, by a suitable adhesive, another ply of material 4. The ply 4 may be of paper which in itself is ornamental or decorative or it may be subsequently decorated as by printing.

The members 2 and 4 are laminated together and the reinforcement is associated therewith by means of apparatus to be later described. The composite structure is indicated by 6 in Fig. 1 and the reinforcement is referenced as R.

The reinforcement R extends longitudinally of the composite web 6 and may be spaced or arranged as desired. Where the composite web is to be cut into sheets the reinforcing members will be located therein so as to have a predetermined position in each of the box blanks to be cut from the sheets.

The web 6 is preferably cut into sheets of a size adapted for printing, when desired, and for cutting or dieing out into blanks for boxes or closures. Depending on the size of the blanks, there may be more or less of them in a sheet.

In the form of the invention being described, each blank B has a body part 10, side walls 12 and end walls 14 with score lines 16 and 18 to facilitate folding. The walls 12 may have flaps 12' and the walls 14 may have flaps 14', there being score lines 15 and 17, as shown. Extensions or tabs 22 which are bendable on lines 22' are also provided on each blank as shown.

The reinforcement R in the sheet (and therefor in the blanks) is disposed to extend along and in each side wall 12. The reinforcement may be disposed in the web to be located in any desired manner in the blank.

The reinforcement may be a cord, string, plurality of cords, a ribbon or ribbons, or combinations of them and the material from which the said reinforcement is made may be varied. That is, the reinforcement may be of fibrous material, cellulose material or whatever may be desired for the particular requirement to be met.

In the instant case the reinforcement R is cord-like and is disposed to extend along the side walls and around the corners of the box or closure when set up to reinforce the same.

The blanks 10 shown are closures or covers for boxes and they may be ornamented as at 24 by printing the sheets before the dieing out operation.

With the particular blanks shown, the side walls 12 are folded downwardly with the flaps 12' folded upwardly and inwardly against the said walls 12. The end walls 14 are folded downwardly and the extensions 22 are folded inwardly transversely to lie between the end walls 14 and flaps 14' which are folded upwardly, all as shown in Fig. 6.

Thus, it will be seen, the reinforcement R contained in the web and later in the blank is now disposed along the side walls and around the corners of the box to reinforce said corners and prevent the breaking down thereof. The parts described as being folded may be secured together in any desired manner as by an adhesive, staples, or the like.

In forming the web which is subsequently cut into sheets, the ply of material 4 is in the form of a roll 30 which is supported on an arbor 32 rotatable between spaced side frames 34. The web 4 is then led over idler rolls 36 and 38 to a roll 40, from which it passes between rolls 42 and 42 and then between rolls 44 and 46.

The ply or web 2 is also preferably in the form of a roll 48 supported on a rotatable arbor 50 and it passes therefrom over guide rolls 52, between rolls 54 and 56 and then over guide rolls 58 to rolls 44 and 46. Roll 56 is for applying adhesive to the ply 2 which is supplied from a container 60.

Reinforcement R may be supplied from packages on spools 76 thereof and it is led to the rolls 44 and 46 where the plies 2 and 4 are pressed together so as to include the reinforcement. Other rolls 62 and 62 are provided between which the web 6 consisting of the superposed plies and reinforcement are led.

The rolls are suitably operatively connected and driven in any well-known manner so that the laminated plies are drawn through the apparatus and is wound up in roll form.

Brackets 70 are provided in spaced relation and they carry a support member 72 on which are located a plurality of members 74 for packages or spools 76 of reinforcing material R. A tank 78 carries a supply of adhesive and a rod or roll 30 is provided therein.

A transverse support 82 has adjustable therealong a plurality of guides 84 provided with apertures through which the reinforcement passes to the roll 80. A pair of plates 86 having a pair of resilient pads 88 therebetween are provided above the tank 78, the pads 88 serving to remove excess adhesive from the reinforcement which is taken on by it in the tank 78.

A transverse member 90 has a guide bar 92 reciprocable therein and the guide bar carries pairs of guide members 94 disposed on members 96. The reinforcement R passes between the guide members of a pair and the members 96 are adjustable along member 92 to locate the reinforcing members relative to one another as may be desired.

Because the ply 2, as it passes through the apparatus, is likely to shift back and forth and because it is desirable to locate the reinforcing members relative to one another and to one side of the web, the member 92 is located relative to that side. To accomplish this a peripherally grooved roll 100 rotatable on a stud 102 on member 92 which receives the edge of the web 2. A member 104 on a transverse bar 106 carries a stud 108 for the attachment of one end of a spring 110 which has its opposite end connected to stud 102.

The roll and spring function as a follower so that the bar moves back and forth accordingly as the web shifts transversely and in that way the reinforcing members are located in the web in a predetermined relation or spacing with respect to the side edge of the web. The guide mechanism is adjustable to facilitate spacing of the reinforcing members in the web as may be desired to obtain a predetermined arrangement of reinforcing members in the box blanks.

Various forms of apparatus may be employed for carrying out the invention, the form shown being more for purposes of illustrating the invention than otherwise.

From the foregoing it will be observed that a composite web is provided wherein longitudinally extending reinforcing members are provided and arranged so as to have a predetermined position or positions in the sheets which are cut from the web.

Where the sheets are operated upon to provide blanks for closures, boxes and the like, it is possible to reinforce the same as may be desired. In the form of the invention illustrated the reinforcement extends along the side walls of the box or closure when in set-up condition and around the corners thereof to reinforce the same which functions to insure against injury and damage.

It is desirable that the roll 44 be of more or less resilient material, such as rubber, so that it yields somewhat to the greater thickness of the sheet 6 caused by the reinforcement, as shown in Fig. 11. That is, the pressure of the rolls 44 and 46 is such that the plies 2 and 4 are firmly united and the cord R becomes more or less embedded in the web 2 so that the outer surfaces are substantially flat rather than bumped up.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. Apparatus for making a composite reinforced web comprising, pairs of coacting rolls spaced longitudinally of the machine for receiving superposed webs of material therebetween and pressing the same together, means for supplying separate webs in superposed relation to said rolls, means for applying adhesive to the surface of one of said webs, a support for a plurality of supplies of reinforcing strips, means for applying adhesive to a plurality of reinforcing strips, guide means for guiding reinforcing strips between webs prior to entrance thereof between said rolls in predetermined spaced arrangement relative to one another and to an edge of said webs including a support member slidable back and forth transversely of the machine having separate reinforcing strip guide members, means for moving said support member accordingly as said superposed webs move axially of said rolls including a contact member on said support member for engaging an edge of said webs and spring means acting on the support member causing said contact member to engage and follow said edge of the webs as said edge moves back and forth.

2. Apparatus for making a composite reinforced web comprising, pairs of coacting rolls spaced longitudinally of the machine for receiving superposed webs of material therebetween and pressing the same together, means for supplying separate webs in superposed relation to said rolls, means for applying adhesive to the surface of one of said webs, a support for a plurality of supplies of reinforcing strips, means for applying adhesive to a plurality of reinforcing strips, including a guide having spaced guide means forwardly of an adhesive tank and a wiper rearwardly thereof through all of which said reinforcing strips may pass, guide means for guiding reinforcing strips between webs prior to entrance thereof between said rolls in predetermined spaced arrangement relative to one another and to an edge of said webs including a support member slidable back and forth transversely of the machine having separate reinforcing strip guide members, means for moving said support member accordingly as said superposed webs move axially of said rolls including a contact member on said support member for engaging an edge of said webs and spring means acting on the support member causing said contact member to engage and follow said edge of the webs as said edge moves back and forth.

3. Apparatus for making a composite reinforced web comprising, pairs of coacting rolls spaced longitudinally of the machine for receiving superposed webs of material therebetween and pressing the same together, means for supplying separate webs in superposed relation to said rolls, means for applying adhesive to the surface of one of said webs, a support for a plurality of supplies of reinforcing strips, means for applying adhesive to a plurality of reinforcing strips, including a guide having spaced guide means forwardly of an adhesive tank and a wiper rearwardly thereof through all of which said reinforcing strips may pass, guide means for guiding reinforcing strips between webs prior to entrance thereof between said rolls in predetermined spaced arrangement relative to one another and to an edge of said webs including a support member slidable back and forth transversely of the machine having separate reinforcing strip guide members, means for moving said support member accordingly as said superposed webs move axially of said rolls including a contact member on said support member for engaging an edge of said webs and spring means acting on the support member causing said contact member to engage and follow said edge of the webs as said edge moves back and forth, said guide members including bodies independently adjustable along said support member having parts through which said reinforcing strips pass.

LEROY F. BANNON.